(12) United States Patent
Yuan et al.

(10) Patent No.: US 10,394,085 B2
(45) Date of Patent: Aug. 27, 2019

(54) DISPLAY SUBSTRATE, METHOD OF MANUFACTURING THE SAME AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Hongliang Yuan, Beijing (CN); Li Ma, Beijing (CN); Kaixuan Wang, Beijing (CN); Xiaojuan Wu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 43 days.

(21) Appl. No.: 15/217,300

(22) Filed: Jul. 22, 2016

(65) Prior Publication Data

US 2017/0285229 A1 Oct. 5, 2017

(30) Foreign Application Priority Data

Mar. 30, 2016 (CN) .......................... 2016 1 0191434

(51) Int. Cl.
*G02F 1/1339* (2006.01)
*G02F 1/1362* (2006.01)
(Continued)

(52) U.S. Cl.
CPC ............ *G02F 1/1339* (2013.01); *G02B 5/003* (2013.01); *G02F 1/133512* (2013.01); *G02F 1/136209* (2013.01)

(58) Field of Classification Search
CPC ......... G02F 1/136209; G02F 1/133512; G02F 1/1339; G02B 5/20; G03F 7/70
See application file for complete search history.

(56) References Cited

U.S. PATENT DOCUMENTS

2009/0086150 A1* 4/2009 Koyama ............ G02B 27/2214
349/153
2012/0026449 A1* 2/2012 Yang ..................... G02F 1/1339
349/153
(Continued)

FOREIGN PATENT DOCUMENTS

CN 1648731 A 8/2005
CN 201159809 Y 12/2008
(Continued)

OTHER PUBLICATIONS

Office Action regarding Chinese Patent Application No. 201610191434.3, dated Apr. 18, 2018. Translation provided by Dragon Intellectual Property Law Firm.

*Primary Examiner* — Nathanael R Briggs
(74) *Attorney, Agent, or Firm* — Harness, Dickey & Pierce, P.L.C.

(57) ABSTRACT

The present disclosure discloses a display substrate, a method of manufacturing the same and a display device. The display substrate includes a base substrate; and a first light shielding pattern that is provided on the base substrate at a side facing an opposite substrate, wherein there is a predetermined distance between an edge of the first light shielding pattern and an edge of the base substrate; and a second light shielding pattern that is provided on the base substrate at a side away from the opposite substrate, wherein an edge of the second light shielding pattern is flush with the edge of the base substrate.

15 Claims, 5 Drawing Sheets

(51) Int. Cl.
*G02F 1/1335* (2006.01)
*G02B 5/00* (2006.01)

(56) References Cited

U.S. PATENT DOCUMENTS

| | | | |
|---|---|---|---|
| 2012/0188151 A1* | 7/2012 | Oh | G02F 1/133512 345/88 |
| 2012/0200805 A1* | 8/2012 | Harayama | G02F 1/133512 349/62 |
| 2012/0229736 A1* | 9/2012 | Osaki | G02F 1/133512 349/96 |
| 2014/0176853 A1* | 6/2014 | Wang | G02F 1/133308 349/58 |
| 2015/0301370 A1* | 10/2015 | Moriwaki | G02F 1/1339 349/42 |
| 2016/0103345 A1* | 4/2016 | Lee | G02F 1/133351 349/110 |
| 2016/0154260 A1* | 6/2016 | Chen | G02F 1/1337 349/42 |

FOREIGN PATENT DOCUMENTS

| | | |
|---|---|---|
| JP | 2012113051 A | 6/2012 |
| KR | 101087328 B1 | 11/2011 |

* cited by examiner

DISPLAY SUBSTRATE, METHOD OF MANUFACTURING THE SAME AND DISPLAY DEVICE

CROSS-REFERENCE TO RELATED APPLICATION

This application claims a priority to Chinese Patent Application No. 201610191434.3 filed before the SIPO on Mar. 30, 2016, the disclosure of which is incorporated in its entirety by reference herein.

TECHNICAL FIELD

The present disclosure relates to the field of the display technology, in particular to a display substrate, a method of manufacturing the same, and a display device.

BACKGROUND

Currently, a width of a sealing area of a display panel in a mobile device product and a touch computer product generally is designed to be within 1.0 and 1.2 mm so as to meet requirements for a narrow sealing area. In related arts, in accordance with different designs, a light leakage may occur, or when an edge of a panel is touched by a user, the display panel may turn green, pink or purple due to the static electricity, which adversely affects a display effect of the display panel and the user's viewing experience.

SUMMARY

A main object of the present disclosure is to prevent the user from viewing the light leakage from the edge side of the display panel and prevent the static electricity generated during a production process from being lead into the display panel, so as to improve the display effect.

For achieving the above object, in one aspect, the present disclosure provides a display substrate, which includes a base substrate; and a first light shielding pattern that is provided on the base substrate at a side facing an opposite substrate, wherein there is a predetermined distance between an edge of the first light shielding pattern and an edge of the base substrate; and a second light shielding pattern that is provided on the base substrate at a side away from the opposite substrate, wherein an edge of the second light shielding pattern is flush with the edge of the base substrate.

Alternatively, a width of the second light shielding pattern is equal to or greater than the predetermined distance.

Alternatively, the predetermined distance ranges from 0.1 mm to 0.2 mm.

Alternatively, the predetermined distance ranges from 0.15 mm to 0.2 mm.

Alternatively, the width of the second light shielding pattern ranges from 0.3 mm to 0.4 mm.

Alternatively, the second light shielding pattern is a rectangular ring.

Alternatively, the first light shielding pattern is a black matrix.

Alternatively, the second light shielding pattern and the black matrix are made of the same material.

Alternatively, the black matrix is made of acrylic resin and a black pigment.

Alternatively, the display substrate is an array substrate or a color film substrate.

In another aspect, the present disclosure provides a display device, which includes the above display substrate.

In yet another aspect, the present disclosure provides a method of manufacturing a display substrate, which includes steps of: forming a first light shielding pattern on a base substrate at a side facing an opposite substrate, wherein there is a predetermined distance between an edge of the first light shielding pattern and an edge of the base substrate; and forming a second light shielding pattern on the base substrate at a side away from the opposite substrate, wherein an edge of the second light shielding pattern is flush with the edge of the base substrate.

Alternatively, a width of the second light shielding pattern is equal to or greater than the predetermined distance.

Alternatively, the predetermined distance ranges from 0.1 mm to 0.2 mm, and the width of the second light shielding pattern ranges from 0.3 mm to 0.4 mm.

Compared with the related art, according to the display substrate, the method of manufacturing the same and the display device of the present disclosure, it is able to prevent the user from viewing the light leakage from the edge side of the display panel and prevent the static electricity generated during the production process from being lead into the display panel, so as to improve the display effect.

DETAILED DESCRIPTION

The technical solutions in embodiments of the present disclosure will be described in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

For the current product with a small size (less than 5.0 inch), the sealing area (which is located between a display region and an outer edge of the glass substrate) substantially ranges from 0.9 to 1.0 mm. Therefore, the sealant is usually designed to be flush with the cutting lines. Considering the requirements of the wetted area in the sealant coating process, the width of the sealant generally ranges from 0.5 to 0.55 mm, wherein the wetted area is equal to a sealant width times a size of a silicon ball (a post spacer). For example, when the wetted area of a device is 2300 um$^2$ and the size of the silicon ball is 4.2 um, the sealant width should be 0.55 mm.

For meeting requirements of designing a narrow sealing area, two manners of designing the sealing area are generally adopted as follows.

Figure 1A:
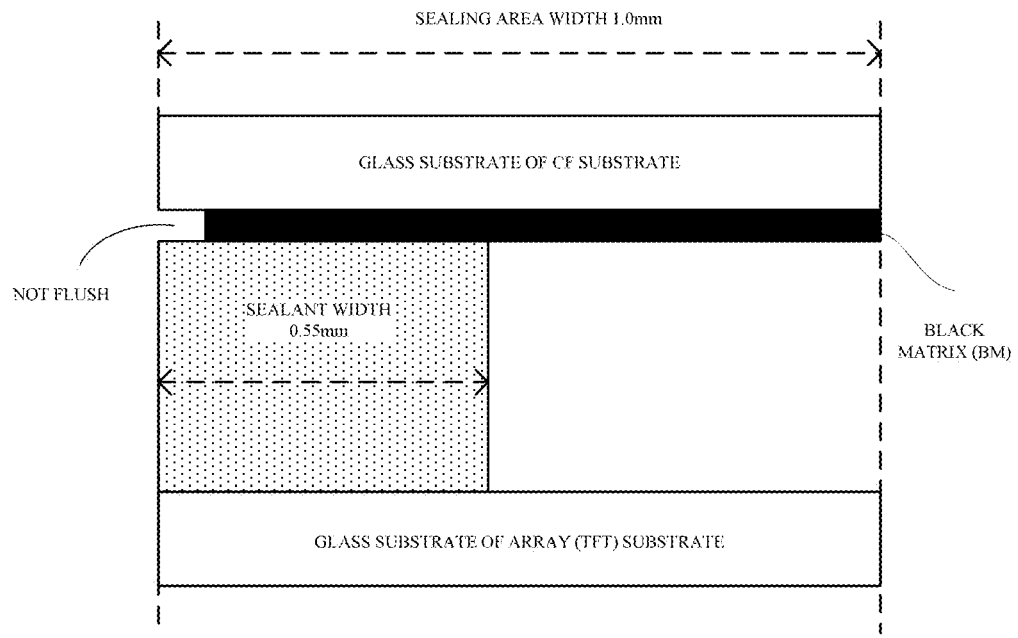
FIG. 1A is a schematic view showing a design in which an edge of a black matrix (BM) and an edge of a glass substrate are not flush.
Figure 1B:
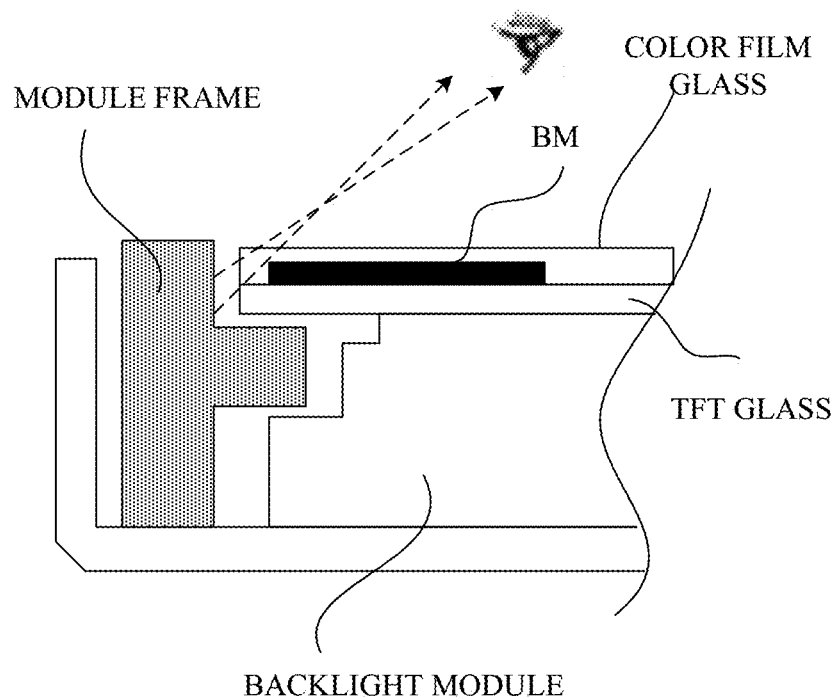
FIG. 1B is a schematic view showing a module frame and a reflected light beam at a side view angle according to FIG. 1A.

(1) An edge of a black matrix (BM) and an edge of a glass substrate is not flush, as shown in FIG. 1A, which is a schematic view showing a design in which an edge of a BM and an edge of a glass substrate are not flush in related art, and a module frame will reflect light emitted from a backlight module to the outside of a color film substrate in an oblique direction. From the viewing angle of the user, a light leakage will be present at an edge side of the display panel, as shown in FIG. 1B, which is a schematic view showing a module frame and the reflected light beam at a side view angle according to FIG. 1A. Therefore, it will adversely affect the display effect of the display panel and the user's viewing experience.

Figure 2:
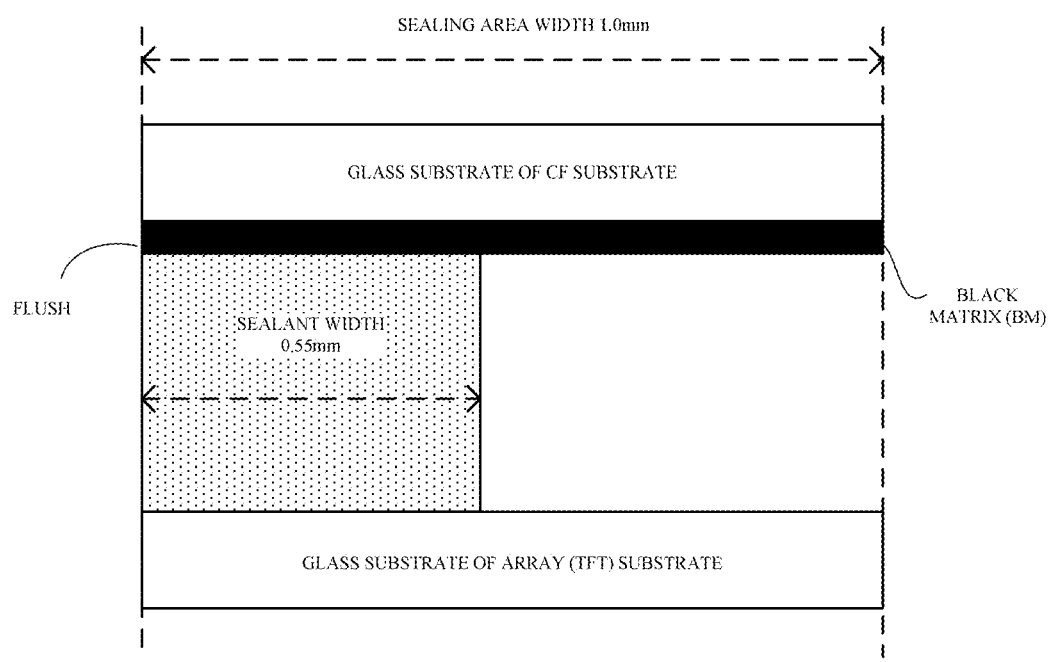
FIG. 2 is a schematic view showing a design in which an edge of a BM and an edge of a glass substrate are flush.

(2) An edge of a BM and an edge of a glass substrate are flush, as shown in FIG. 2, which is a schematic view showing a design in which an edge of a BM and an edge of a glass substrate are flush. The current BM has a relatively small resistance, and thus, when the edge of the touch panel is touch by the user during the production process, the static electricity will be led into the panel from the BM, which may cause the panel to become green, pink or purple so that the display effect is adversely affected.

Two manners of designing a narrow sealing area are mentioned above. As for the design manner (1), since the light from the backlight module is leaked from the edge side of the display panel, the display effect of the display panel is reduced, and the user's viewing effect is affected. As for the design manner (2), the static electricity generated during the production process may be led into the display panel from the BM, and a poor display will occur. In other words, neither of the two manners ensure the display effect of the display panel. In view of the above, the present disclosure provides the following improved technical solutions.

The present disclosure in some embodiments provides a base substrate; and a first light shielding pattern that is provided on the base substrate at a side facing an opposite substrate, wherein there is a predetermined distance between an edge of the first light shielding pattern and an edge of the base substrate; and a second light shielding pattern that is provided on the base substrate at a side away from the opposite substrate, wherein an edge of the second light shielding pattern is flush with the edge of the base substrate.

The display substrate may be an array substrate or a color film substrate, and the opposite substrate is configured to form a cell with the display substrate so as to form a complete display panel. Therefore, in the embodiments of the present disclosure, the display substrate may be an array substrate and in such a case, the opposite substrate may be a color film substrate. Alternatively, the display substrate may be a color film substrate and in such a case, the opposite substrate may be an array substrate.

In other words, in the embodiments of the present disclosure, the two light shielding patterns can be provided on the two display substrates in the above manners so as to achieve the object of the present disclosure. During actual uses, in most cases, the first light shielding pattern is provided on the color film substrate, and it is generally provided between the color film substrate and the array substrate.

As an alternative example, the first light shielding pattern is a black matrix (BM). That is, the BM is provided on the base substrate (e.g. a color film substrate) of the display panel at a side facing the opposite substrate (e.g. an array substrate). There is a predetermined distance between an edge of the BM and an edge of the base substrate. As can be seen, the edge of the BM and the edge of the base substrate (e.g. the glass substrate of the color film substrate) are not flush. Naturally, with such a disposition manner, a notch is formed at the edge of the BM relative to the display substrate and the opposite substrate.

With the above disposition manner, the light leakage is present. That is, the light from the backlight module may be reflected to the outside of the display panel from the notch, and a viewer may see a light leakage beam. For avoiding the light leakage, a second light shielding pattern is provided at the base substrate (e.g. the glass substrate of the color film substrate) at a side that is away from the opposite substrate (e.g. the array substrate).

The edge of the second light shielding pattern is flush with the edge of the base substrate. Therefore, when the light from the backlight module is emitted from the above notch, it is blocked by the second light shielding pattern so that the light cannot be viewed by the viewer, thereby enhancing the viewing experience.

Of course, for enabling the second light shielding pattern to have an effective shielding effect, the width of the second light shielding pattern may be equal to or greater than the predetermined distance. In such a manner, the second light shielding pattern can shield the leaked light from the notch to the greatest extent so as to ensure that the viewer cannot see the leaked light.

For meeting the requirements of designing a narrow sealing area, in the above disposition manner of not being flush, the distance between the edge of the BM and the edge of the base substrate (i.e. the predetermined distance) is very small. For example, in the embodiments of the present disclosure, the predetermined distance is set to range from 0.1 mm to 0.2 mm, which may cover the design of most of the current narrow sealing areas.

Based on that, for better shielding the leaked light from the notch, in embodiments of the present disclosure, the width of the second light shielding pattern is set to range from 0.3 mm to 0.4 mm.

Figure 3:
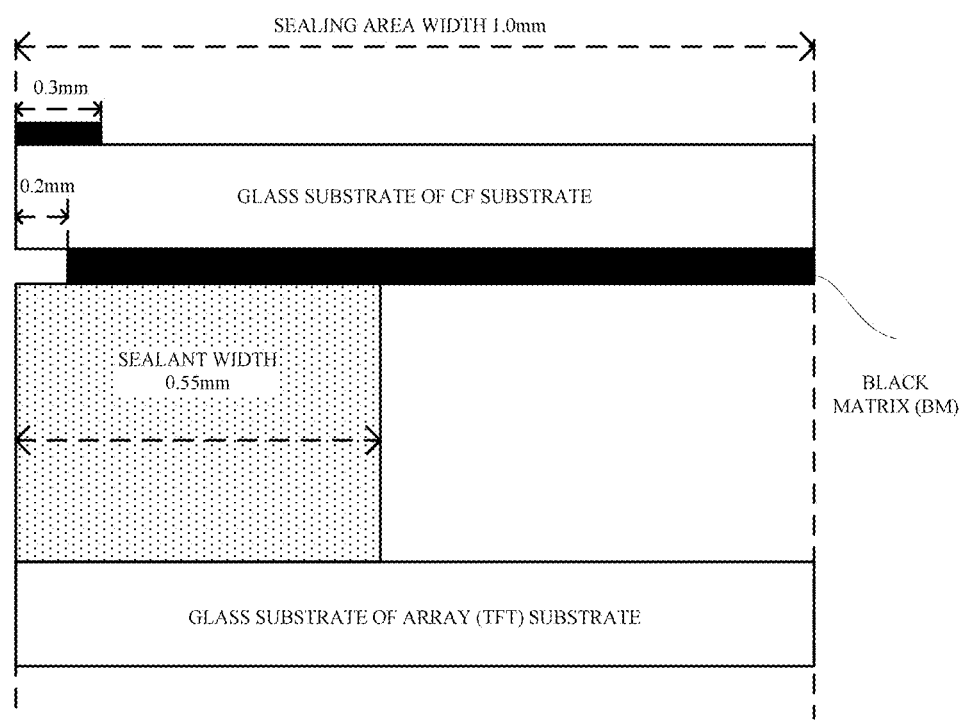
FIG. 3 is a schematic view showing a part of a sealing area of a display device consisting of a color film (CF) substrate and an array substrate according to some embodiments of the present disclosure.

Referring to FIG. 3, which is a schematic view showing a part of a sealing area of a display device consisting of a color film (CF) substrate and an array substrate according to some embodiments of the present disclosure, a distance between the edge of the BM and the edge of the glass substrate of the CF substrate, i.e. the predetermined distance is 0.2 mm. A width of a shielding coating layer (i.e. the second light shielding pattern) provided at the edge of the glass substrate of the CF substrate is 0.3 mm.

For simplifying the manufacturing process, as an alternative embodiment of the present disclosure, the second light shielding pattern and the black matrix (i.e. the first light shielding pattern) may be made of the same material. For example, acrylic resin and a black pigment may be used. Regarding to FIG. 3, the light shielding coating layer (i.e. the second light shielding pattern) provided at the edge of the glass substrate of the CF substrate and the black matrix are made of the same material.

Figure 4A:
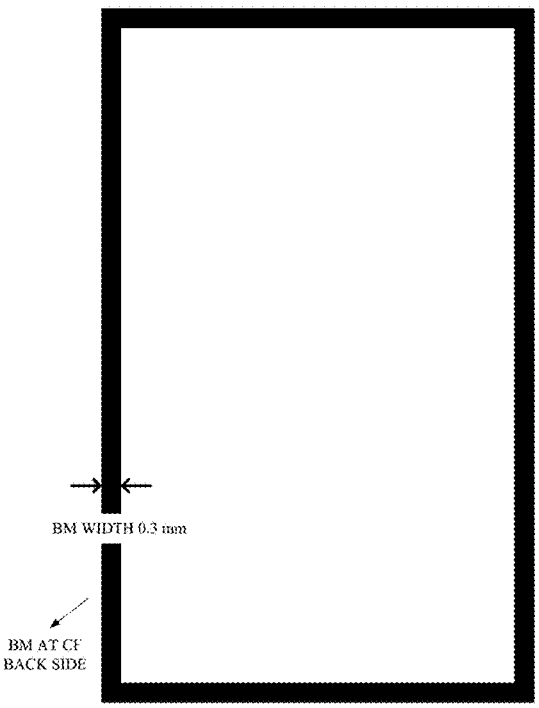
FIG. 4A is an outline schematic view showing a second light shielding pattern (BM) of a CF substrate at a side away from the opposite substrate according to some embodiments of the present disclosure.
Figure 4B:
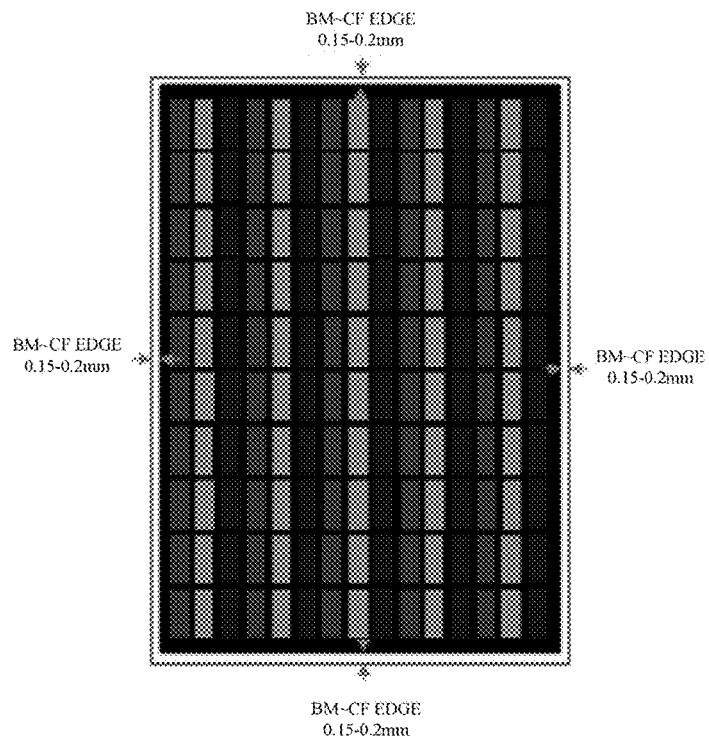
FIG. 4B is a schematic view showing a first light shielding pattern (BM) of a CF substrate at a side facing the opposite substrate according to some embodiments of the present disclosure.

Referring to FIG. 3, the BM and the glass substrate are not flush. For preventing the light leakage from being viewed at the side view angle to the greatest extent, the predetermined distance is further set to range from 0.15 mm to 0.2 mm, and the second light shielding pattern is set to be a rectangular ring. FIG. 4A is an outline schematic view showing a second light shielding pattern (BM) of a CF substrate at a side facing the opposite substrate according to some embodiments of the present disclosure, and FIG. 4B is a schematic view showing a first light shielding pattern (BM) of a CF substrate at a side facing the opposite substrate according to some embodiments of the present disclosure. FIGS. 4A and 4B can visually show the shape and the position of the second light shielding pattern. Overall, when the above manner is adopted, the light leakage from the module can be avoided to be viewed at the side view angle, and the introduction of the static electricity into the panel from the BM can be prevented as well.

Based on the above display substrate, the present disclosure in some embodiments provides a display device, which includes the above display substrate. Improvements on the display device lie in the improvements on the display substrate, and the embodiments of the present disclosure have described the display substrate in detail. Therefore, the display device is not described in conjunction with the figures any more.

Figure 5:
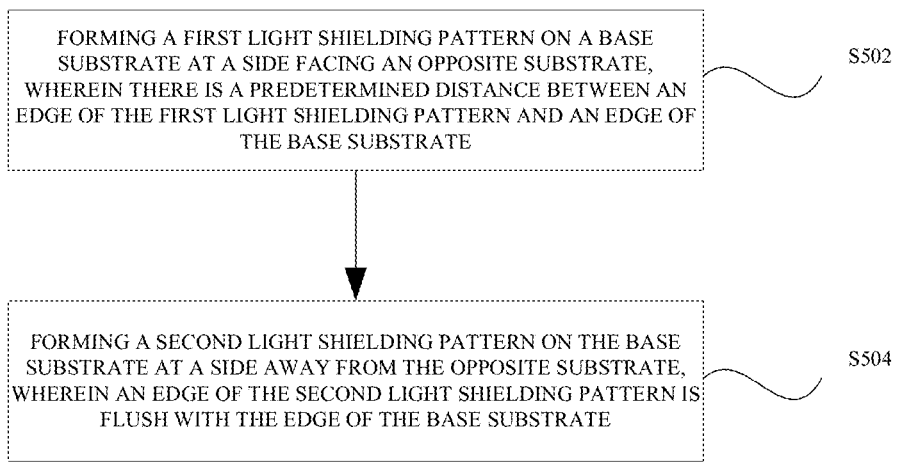
FIG. 5 is a flow chart showing a method of manufacturing a display substrate according to some embodiments of the present disclosure.

Corresponding to the display substrate, the present disclosure in some embodiments provides a method of manufacturing a display substrate. FIG. 5 is a flow chart showing a method of manufacturing a display substrate according to some embodiments of the present disclosure. As shown in FIG. 5, the process includes the following steps (steps S502 to steps S504): step S502: forming a first light shielding pattern on a base substrate at a side facing an opposite substrate, wherein there is a predetermined distance between an edge of the first light shielding pattern and an edge of the base substrate; and S504: forming a second light shielding pattern on the base substrate at a side away from the opposite substrate, wherein an edge of the second light shielding pattern is flush with the edge of the base substrate.

As an alternative manner of the embodiment, during the manufacturing process, a width of the second light shielding pattern may be set to be equal to or greater than the predetermined distance. In such a way, it can be ensured that the second light shielding pattern can completely shield the leaked light that is emitted by the backlight module and passes through the notch formed between the first light shielding pattern and the edge of the base substrate.

As an alternative example, the predetermined distance may be set to range from 0.1 mm to 0.2 mm, and the width of the second light shielding pattern may be set to range from 0.3 mm to 0.4 mm for creating an effective shielding.

As an alternative example, during an actual manufacturing process, when the color film (CF) substrate is manufactured, a BM apart from the edge of the CF substrate by 0.15-0.2 mm may be formed firstly at a back side of the glass substrate of the CF substrate using a mask, then the glass substrate is reversed, and a BM pattern is formed at a front side of the glass substrate by coating, exposing and developing processes.

Through the above embodiments, the light leakage viewed by the user from the edge side of the display panel in the case that the BM is not flush with the glass substrate can be avoided, and the reduction of the display effect, which is caused by leading the static electricity that is generated when the panel is touched by the user during a production process into the display panel in the case that the BM is flush with the glass substrate, can be prevented. Therefore, the display effect of the display panel can be greatly improved, the user's viewing experience is effectively enhanced, and the process complexity is not increased.

The above are merely the preferred embodiments of the present disclosure. It should be noted that, a person skilled in the art may make further modifications and improvements without departing from the principle of the present disclosure, and these modifications and improvements shall also fall within the scope of the present disclosure.

What is claimed is:

1. A display substrate, comprising:
   a base substrate and an opposite substrate, the base substrate and the opposite substrate being aligned to each other at four edges;
   a sealant, arranged between the base substrate and the opposite substrate and an edge of the sealant is flush with the edge of the base substrate and the edge of the opposite substrate;
   a first light shielding pattern that is provided on the base substrate at a side facing the opposite substrate, and in direct contact with the sealant; and
   a second light shielding pattern that is provided on the base substrate at a side away from the opposite substrate, wherein an edge of the second light shielding pattern is flush with the edge of the base substrate,
   wherein the base substrate consists of a center region and a periphery region, the center region has four edges having a predetermined distance to the four edges of the base substrate, the first light shielding pattern is a pattern that is formed throughout the center region,
   wherein the predetermined distance ranges from 0.1 mm to 0.15 mm.

2. The display substrate according to claim 1, wherein the width of the second light shielding pattern ranges from 0.3 mm to 0.4 mm.

3. The display substrate according to claim 2, wherein the second light shielding pattern is a rectangular ring.

4. The display substrate according to claim 1, wherein the first light shielding pattern is a black matrix.

5. The display substrate according to claim 4, wherein the second light shielding pattern and the black matrix are made of the same material.

6. The display substrate according to claim 5, wherein the black matrix is made of acrylic resin and a black pigment.

7. The display substrate according to claim 1, wherein the display substrate is an array substrate or a color film substrate.

8. A display device, comprising the display substrate according to claim 1.

9. The display device according to claim 8, wherein the width of the second light shielding pattern ranges from 0.3 mm to 0.4 mm.

10. The display device according to claim 8, wherein a first light shielding pattern is a black matrix.

11. The display device according to claim 10, wherein a second light shielding pattern and the black matrix are made of the same material.

12. The display device according to claim 8, wherein the display substrate is an array substrate or a color film substrate.

13. A method of manufacturing a display substrate, comprising steps:
  forming a sealant between a base substrate and an opposite substrate and an edge of the sealant being flush with the edge of the base substrate and the edge of the opposite substrate;
  forming a first light shielding pattern on a base substrate at a side facing an opposite substrate, the first light shielding being in direct contact with the sealant; and
  forming a second light shielding pattern on the base substrate at a side away from the opposite substrate, wherein an edge of the second light shielding pattern is flush with the edge of the base substrate,
  wherein the base substrate and the opposite substrate being aligned to each other at four edges,
  wherein the base substrate consists of a center region and a periphery region, the center region has four edges having a predetermined distance to the four edges of the base substrate, the first light shielding pattern is a pattern that is formed throughout the center region,
  wherein a width of the second light shielding pattern is equal to or greater than the predetermined distance,
  wherein the predetermined distance ranges from 0.1 mm to 0.15 mm, and the width of the second light shielding pattern ranges from 0.3 mm to 0.4 mm.

14. The display substrate according to claim 1, wherein the width of the sealant is 0.55 mm.

15. A display substrate, comprising:
  a base substrate and an opposite substrate, the base substrate and the opposite substrate being aligned to each other at four edges;
  a sealant, arranged between the base substrate and the opposite substrate and an edge of the sealant is flush with the edge of the base substrate and the edge of the opposite substrate;
  a first light shielding pattern that is provided on the base substrate at a side facing the opposite substrate, and in direct contact with the sealant; and
  a second light shielding pattern that is provided on the base substrate at a side away from the opposite substrate, wherein an edge of the second light shielding pattern is flush with the edge of the base substrate,
  wherein the base substrate consists of a center region and a periphery region, the center region has four edges having a predetermined distance to the four edges of the base substrate, the first light shielding pattern is a pattern that is formed throughout the center region,
  wherein the width of the second light shielding pattern ranges from 0.3 mm to 0.4 mm.

* * * * *